US012792375B2

(12) United States Patent
Dey et al.

(10) Patent No.: US 12,792,375 B2
(45) Date of Patent: Nov. 10, 2026

(54) METHODS AND SYSTEMS FOR A DATA DRIVEN POLICY-BASED APPROACH TO IMPROVE UPGRADE EFFICACY

(71) Applicant: Pensando Systems Inc., Milpitas, CA (US)

(72) Inventors: Chinmoy Dey, West Bengal (IN); Hareesh Ramachandran, Bangalore (IN); Kalyan Bade, Bangalore (IN)

(73) Assignee: Pensando Systems Inc., Milpitas, CA (US)

( * ) Notice: Subject to any disclaimer, the term of this patent is extended or adjusted under 35 U.S.C. 154(b) by 802 days.

(21) Appl. No.: 17/226,669

(22) Filed: Apr. 9, 2021

(65) Prior Publication Data

US 2022/0326976 A1 Oct. 13, 2022

(51) Int. Cl.

| | |
|---|---|
| ***G06F 9/455*** | (2018.01) |
| ***G06F 8/65*** | (2018.01) |
| ***G06F 8/71*** | (2018.01) |
| ***G06F 11/34*** | (2006.01) |
| ***G06F 11/3668*** | (2025.01) |

(52) U.S. Cl.

CPC ............ *G06F 9/45558* (2013.01); *G06F 8/65* (2013.01); *G06F 8/71* (2013.01); *G06F 11/3409* (2013.01); *G06F 11/3692* (2013.01); *G06F 2009/4557* (2013.01); *G06F 2009/45595* (2013.01)

(58) Field of Classification Search

None

See application file for complete search history.

(56) References Cited

U.S. PATENT DOCUMENTS

| | | | | |
|---|---|---|---|---|
| 8,122,446 | B2 | 2/2012 | Moore et al. | |
| 9,575,738 | B1 * | 2/2017 | Chopra | G06F 8/60 |
| 9,760,428 | B1 | 9/2017 | Felstaine et al. | |
| 10,374,888 | B2 | 8/2019 | Mahimkar et al. | |
| 10,869,199 | B2 | 12/2020 | Raleigh et al. | |
| 11,736,566 | B2 * | 8/2023 | Cherian | H04L 69/16 718/1 |
| 2004/0031029 | A1 | 2/2004 | Lee et al. | |

(Continued)

OTHER PUBLICATIONS

Gerhards, R. "The Syslog Protocol", Request for Comments: 5424, Mar. 2009, 38 pgs.

(Continued)

*Primary Examiner* — Chat C Do
*Assistant Examiner* — William C Wood

(57) ABSTRACT

Before upgrading a node, a critical state policy can determine whether the node is currently in a critical state. Nodes in critical states should not be upgraded whereas nodes in noncritical states can be. Critical state policies can determine if a node is currently in a critical state and different types of nodes can have different critical state policies. A critical state policy can be stored and used when needed. A critical state policy can use current values for nonconstant node attributes to determine a criticality state of a node. A directive to perform an upgrade that transitions the node to a new version can be received. The criticality state of the node can be determined after receiving the directive and before performing the upgrade. The upgrade may be performed only when the criticality state of the node indicates that the node is in a noncritical state.

18 Claims, 12 Drawing Sheets

(56) References Cited

U.S. PATENT DOCUMENTS

| | | | | |
|---|---|---|---|---|
| 2008/0222642 | A1* | 9/2008 | Kakarla | G06F 9/5077 718/104 |
| 2014/0040895 | A1* | 2/2014 | Peng | G06F 9/5011 718/1 |
| 2017/0075677 | A1* | 3/2017 | Gross | G01R 31/44 |
| 2017/0078207 | A1* | 3/2017 | Atkins | H04L 47/24 |
| 2017/0153906 | A1* | 6/2017 | Bektas | G06F 9/45558 |
| 2018/0062849 | A1* | 3/2018 | Pope | H04L 63/126 |
| 2018/0262924 | A1* | 9/2018 | Dao | H04W 24/08 |
| 2019/0340089 | A1* | 11/2019 | Doshi | G06F 1/24 |
| 2019/0369980 | A1* | 12/2019 | Mair | H04L 67/10 |
| 2020/0133689 | A1* | 4/2020 | Ferrell | G06F 9/45558 |
| 2020/0293180 | A1 | 9/2020 | Pani | |
| 2022/0399724 | A1* | 12/2022 | Pettersson | H02J 3/466 |

OTHER PUBLICATIONS

Ajmani, Sameer et al. “Scheduling and Simulation: How to Upgrade Distributed Systems”, Sep. 2003, 6 pgs.

* cited by examiner

Constant Node Attributes 301

| | |
|---|---|
| Node Name | OLTP Server 1 West |
| Node Type | OLTP Server |
| Critical State Policy Identifier | OLTP_Version2 |
| Node Groups | Production, Customer |
| Node Role | Cluster Head |
| SmartNIC Type | Pensando DSC-100 |
| SmartNIC Manager | venice.example.com |
| Enable Upgrade Method | HTTP GET "/enableUpgrade.php" |
| Disable Upgrade Method | HTTP GET "/disableUpgrade.php" |
| Upgrade Method | HTTP GET "/Upgrade.php" |
| Upgrade Download Method | FTP "/Upgrade.php" |
| Other Node Tag | Linux KVM |

Attribute Name/Identifier

Value

FIG. 3

Critical State Policy Parameters 501

| | |
|---|---|
| Critical State Policy Identifier (e.g., Critical_US_OLTP) | 502 |
| Endpoint Criteria (e.g., OLTP Server) | 503 |
| Node Group Criteria (e.g., Production and Customer) | 504 |
| Time/Date Exclusion Criteria (e.g., November 25 - December 1) | 505 |
| Role Criteria (e.g., ClusterHead) | 506 |
| Process Criteria (e.g., oltp_proc) | 507 |
| CPU use Criteria (e.g., 70%) | 508 |
| Process CPU use Criteria (e.g., {http_proc, 30% }) | 509 |

Critical State Policy 520

```
def Critical_US_OLTP():
# return NonCritical for Node Group Criteria mismatch
  if  ENDPOINT != "OLTP Server" : return NonCritical

# return nonCritical if not in all Node Group Criteria Groups
  if  not "Production" in NodeGroup : return NonCritical
  if not "Customer" in NodeGroup : return NonCritical

# return NonCritical if outside critical date range
  today = datetime.today
  begin =  datetime.datetime( today.year, 11, 25)
  if today < begin ; return NonCritical
  end =  datetime.datetime( today.year, 12, 1)
  if today > end ; return NonCritical

# return NonCritical if Role Criteria not met
  if not "ClusterHead" in Roles: return NonCritical

# return NonCritical if OLTP server not running
  if "oltp_proc" not in ProcessList: return NonCritical

# return NonCritical if CPU usage below threshhold
  if CPU < 0.7: return NonCritical

# return NonCritical if HTTP server CPU usage below threshhold
  if CPU{http_proc} < 0.3: return NonCritical

return Critical
```

FIG. 5

METHODS AND SYSTEMS FOR A DATA DRIVEN POLICY-BASED APPROACH TO IMPROVE UPGRADE EFFICACY

TECHNICAL FIELD

The embodiments relate to computing systems, network appliances, smart network interface cards (NICS), channel adapters, network interface cards, routers, switches, load balancers, virtual machines, cloud computing, distributed applications, distributed application profiling, upgrading systems and applications, and to scheduling upgrades based on nonconstant metrics.

BACKGROUND

Upgrading computers and applications that run on those computers is a familiar process. In many computing environments, such as cloud computing environments, applications can be implemented as numerous cooperating processes that run within virtual machines (VMs) running on host computers. By today's standards, a modest cloud computing environment can have thousands of computers running tens of thousands of VMs. The computers themselves can have specialized hardware such as smart network interface cards (NICS). The smart NICs are among the plethora of network appliances handing communications within the data center. The many thousands of computers, NICs, network appliances, VMs, and software applications necessitate a managed approach to upgrading computers. Performing upgrades often results in taking resources out of service, which reduces quality of service (QoS) provided by the data center. The data center must therefore attempt to perform upgrades while maintaining QoS levels.

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

One aspect of the subject matter described in this disclosure can be implemented in a method. The method can include storing a critical state policy that uses current values for nonconstant node attributes to determine a criticality state of a node, receiving a directive to perform an upgrade that transitions the node to a new version, determining the criticality state of the node after receiving the directive and before performing the upgrade, and performing the upgrade only when the criticality state of the node indicates that the node is in a noncritical state.

Another aspect of the subject matter described in this disclosure can be implemented by a system. The system can include an upgrade manager configured to communicate over a network with a node, store a critical state policy that uses current values for nonconstant node attributes to determine a criticality state of the node, receive a directive to upgrade the node to a new version, determine the criticality state of the node after receiving the directive and before upgrading the node, and upgrade the node only when the criticality state of the node indicates that the node is in a noncritical state.

Yet another aspect of the subject matter described in this disclosure can be implemented by a system. The system can include a means for receiving a directive for upgrading a node to a new version, a means for determining whether the node is in a noncritical state after the directive is received and before the node is upgraded, and a means for performing the upgrade only when the node is in the noncritical state.

In some implementations of the methods and devices, the critical state policy uses values of constant node attributes to determine the criticality state of the node. In some implementations of the methods and devices, the critical state policy includes a node executable code, and executing the node executable code on the node produces one of the current values. In some implementations of the methods and devices, the method can include maintaining a critical state database that stores a plurality of time series entries that include a timestamp indicating a time, and the criticality state of the node at the time, obtaining a test run result by performing a test run of the critical state policy, and storing the test run result as one of the time series entries. In some implementations of the methods and devices, an upgrade manager is configured to upgrade the node, the upgrade manager communicates over a network with the node, and the upgrade manager determines the criticality state of the node. In some implementations of the methods and devices, the node is configured to periodically provide one of the current values to the upgrade manager.

In some implementations of the methods and devices, the critical state policy includes a node executable code, and one of the current values is produced by executing the node executable code on the node. In some implementations of the methods and devices, a network interface card (NIC) is installed in the node, the NIC is configured to periodically determine one of the current values, and the NIC provides the one of the current values to the upgrade manager. In some implementations of the methods and devices, a network interface card (NIC) is installed in the node, the critical state policy includes a NIC executable code, and one of the current values is produced by executing the NIC executable code on the NIC. In some implementations of the methods and devices, the node is a virtual machine (VM) running on a host computer, a network interface card (NIC) is installed in the host computer, the NIC is configured to periodically determine one of the current values, and the NIC provides the one of the current values to the upgrade manager.

In some implementations of the methods and devices, the node is a virtual machine (VM) running on a host computer, a network interface card (NIC) is installed in the host computer, the critical state policy includes a NIC executable code, and one of the current values is produced by executing the NIC executable code on the NIC. In some implementations of the methods and devices, the current values include a CPU usage statistic, a memory usage statistic, a non-volatile memory input/output statistic, a long-lived network session statistic, a short-lived statistic, and a process identifier that identifies a process running on the node. In some implementations of the methods and devices, the upgrade manager is configured to upgrade a plurality of nodes that are identified by a plurality of node identifiers, the upgrade manager stores a plurality of critical state policies that are associated with the nodes via the plurality of node identifiers, and each of the nodes is upgraded only when in the noncritical state according to the critical state policies. In some implementations of the methods and devices, the method includes producing criticality state time series data that indicates the criticality state of each of the nodes as a function of time, determining upgrade windows for the nodes, and scheduling node upgrades based on the upgrade windows.

In some implementations of the methods and devices, the method includes storing time series data that includes a plurality of time series entries that include a timestamp indicating a time, and the criticality state of the node at the time, obtaining test run data produced by a test run of the critical state policy, and storing the test run data as one of the time series entries. In some implementations of the methods and devices, the critical state policy uses values of constant node attributes to determine the criticality state of the node, the critical state policy includes a node executable code, executing the node executable code on the node produces a first current value, the node is configured to periodically provide the first current value to the upgrade manager, a network interface card (NIC) is installed in the node, the NIC is configured to periodically determine a second current value, the NIC provides the second current value to the upgrade manager, the critical state policy includes a NIC executable code, the second current value is produced by executing the NIC executable code on the NIC, a second node is a virtual machine (VM) running on a host computer, a second NIC is installed in the host computer, the second NIC is configured to periodically determine a third current value, the second NIC provides the third current value to the upgrade manager, the third current value is produced by executing the NIC executable code on the second NIC, and the current values include a CPU usage statistic, a memory usage statistic, a non-volatile memory input/output statistic, a long-lived network session statistic, a short-lived statistic, and a process identifier that identifies a process running on the node.

In some implementations of the methods and devices, the node is configured to periodically provide one of the current values to the upgrade manager. In some implementations of the methods and devices, the critical state policy includes a node executable code, and one of the current values is produced by executing the node executable code on the node. In some implementations of the methods and devices, the node is a virtual machine (VM) running on a host computer, a network interface card (NIC) is installed in the host computer, the NIC is configured to periodically determine one of the current values, and the NIC provides the one of the current values to the upgrade manager. In some implementations of the methods and devices, the node is a virtual machine (VM) running on a host computer, a network interface card (NIC) is installed in the host computer, the critical state policy includes a NIC executable code, and one of the current values is produced by executing the NIC executable code on the NIC.

These and other aspects will become more fully understood upon a review of the detailed description, which follows. Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments such exemplary embodiments can be implemented in various devices, systems, and methods.

BRIEF DESCRIPTION OF THE DRAWINGS

FIG. 3 is a diagram illustrating a nonlimiting example of constant node attributes according to some aspects.

FIG. 5 illustrates critical state policy parameters and a critical state policy according to some aspects.

Throughout the description, similar reference numbers may be used to identify similar elements.

DETAILED DESCRIPTION

Figure 1:
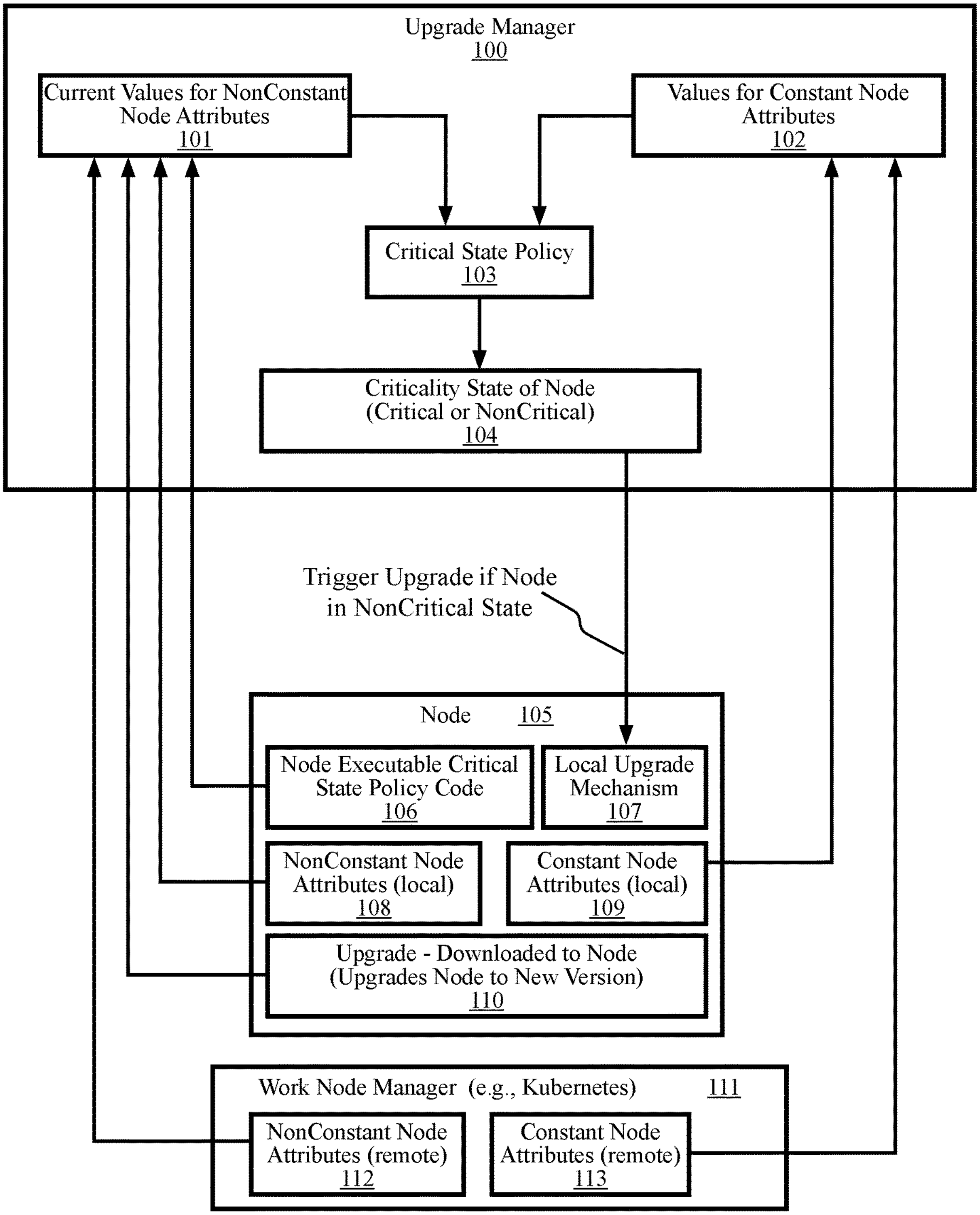
FIG. 1 is a functional block diagram illustrating an upgrade manager upgrading a node according to some aspects.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

Cloud computing services operate data warehouses that are used for providing infrastructure-as-a-service to tenants. A data warehouse can have tens of thousands of host computers communicating via networks implemented with massive amounts of networking equipment. The networking equipment can include routers, switches, and network interface cards (NICs). The NICs can be installed in the host computers and can connect the hosts to the network. Smart NICs are NICs that can perform processing related to network communications that, in the past, was performed by the hosts. Each of the hosts can run numerous virtual machines (VMs). The tenants can use the VMs to serve their customers' needs and their own needs. Managing upgrades in such a large environment is problematic.

The most common upgrade process implemented by data centers and information technology (IT) organizations is to upgrade nodes (e.g., computers, VMs, networking equipment, etc.) on a schedule. For example, the scheduled upgrades are performed outside of business hours, on weekends, etc. Given the scale of computing infrastructure and today's 24 hour per day operations schedule, scheduled upgrades can interfere with the tenants' operations and the cloud service provider's operations. In fact, data centers often give uptime guarantees to their tenants in the form of service level agreements (SLAs). Experience has shown that upgrading according to a set schedule often results in taking down a node that is critical to a tenant's current operations. The scheduled upgrades anger tenants and negatively impact the cloud provider's ability to comply with the SLAs.

One solution to the problems arising from scheduled upgrades is to upgrade equipment only when it is in a noncritical state. Equipment is in a noncritical state when it can be taken offline without causing major disruption to the tenants' operations. Tenants, however, typically do not inform the cloud service provider that nodes are currently critical such as when certain operations are being performed (e.g., rebuilding database indexes, reconciling transactions, having a holiday sales event, etc.) The cloud service provider may therefore use a data driven approach to infer when a particular node is in a critical state or in a noncritical state. The inference can be automated based on policies that use data collected from the nodes. For example, if a node's central processing unit (CPU) usage or input/output (I/O) bandwidth exceeds thresholds, then it may be inferred that the node is currently doing something important and is therefore in a critical state. An upgrade manager, which can be implemented by another one of the nodes, can delay upgrading the node until the node is in a noncritical state.

The advantages of upgrading each node only when it is in a noncritical state include not disrupting critical operations, not angering tenants, providing more reliable services for the tenants' customers, improving uptime, meeting the requirements of the SLAs, being able to offer higher availability via more stringent SLAs, and being able to meet the requirements of those more stringent SLAs.

FIG. 1 is a functional block diagram illustrating an upgrade manager 100 upgrading a node 105 according to some aspects. The upgrade manager 100 can receive current values for nonconstant node attributes 101 and can receive values for constant node attributes 102. Collectively, the nonconstant node attributes and constant node attributes can be referred to as attributes. A critical state policy 103 can use the attributes to infer the criticality state of the node 104. If the criticality state of the node 104 indicates the node is in a critical state, an upgrade can be cancelled or deferred. If the criticality state of the node 104 indicates the node is in a noncritical state, an upgrade can be performed. The upgrade manager can perform an upgrade by downloading an upgrade 110 to the node 105 and triggering the node's local upgrade mechanism. The node can have attributes data such as locally stored constant node attributes 109 and locally stored or determined nonconstant node attributes 108. The node can have and can execute node executable critical state policy code 106. Node executable critical state policy code 106 can be executable code that the node executes to determine one or more nonconstant node attributes 108. In some implementations, the nonconstant node attributes 108 can include a locally determined criticality state indicator that indicates if, according to the node itself, the node is in a critical state or a noncritical state.

Cloud applications can be implemented using numerous nodes that may perform different functions (load balancer, web server, database server, etc.) and may duplicate the functions of other nodes. A work node manager 111, such as Kubernetes, can manage the nodes by launching and halting nodes as required by the application. The work node manager may also have attribute data for the nodes such as nonconstant node attributes 112 and constant node attributes 113.

Figure 2:
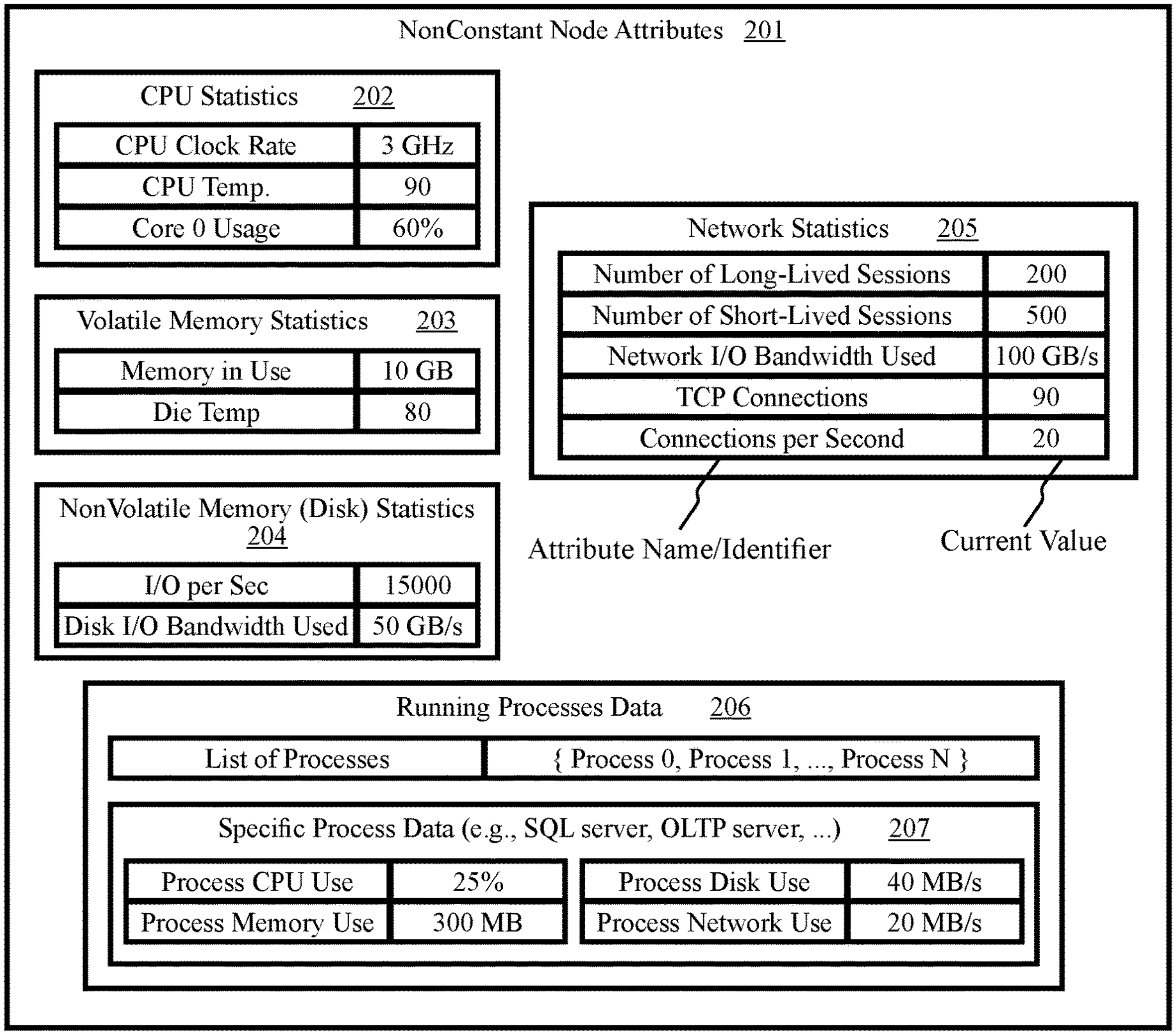
FIG. 2 is a diagram illustrating a nonlimiting example of nonconstant node attributes according to some aspects.

FIG. 2 is a diagram illustrating a nonlimiting example of nonconstant node attributes 201 according to some aspects. The nonconstant node attributes can include CPU statistics 202, volatile memory statistics 203, nonvolatile memory statistics 204, network statistics 205, and running process data 206. The attributes are shown as having attribute names and current values. CPU statistics 202 can include the CPUs current clock rate (CPUs commonly change their clock to adapt to workload, temperature, and other factors), CPU temperature, the percent utilization of CPU cores, etc. The volatile memory statistics 203 relate to the node's volatile memory such as dynamic random-access memory (DRAM) and can include the amount of memory currently in use, the die temperature of the DRAM memory chips, etc. The nonvolatile memory statistics 204 relate to the node's nonvolatile memory such as disk drives, solid state disks, and network attached storage. The nonvolatile memory statistics 204 can include I/O operations per second, I/O bandwidth currently being used, etc. The network statistics 205 relate to the node's communications with other devices and nodes. The network statistics 205 can include the current number of long-lived sessions, the current number of short-lived sessions, the network I/O bandwidth being used, the number of TCP connections, the number of connections that are established per second, etc. Short lived sessions can be network communications between two hosts (e.g., a TCP session) that have lasted less than a specified time. Long lived sessions can be network communications between two hosts (e.g., a TCP session) that have lasted longer than a specified time. In many cases, a NIC installed in a host computer can monitor, measure, and provide the network statistics 205 of the host computer and of nodes that are VMs running on the host computer. NICs that are implementing drivers for remote storage (e.g., InfiniBand channel adapters, NVMe host adapters, etc.) can monitor, measure, and provide non-volatile memory statistics 204 of the host computer and of nodes that are VMs running on the host computer.

The running process data 206 can include a list of processes and specific process data 207. For example, the list of processes currently being run by a node can include a structured query language (SQL) server, an online transaction processing (OLTP) server, etc. Running a particular process may be an indicator that the node is in a critical state. Alternatively, the specific process data 207 for a process can indicate how active the process is. If the specific process data 207 for a specific process exceeds predefined thresholds, then the node running that process may be in a critical state.

Figure 4:
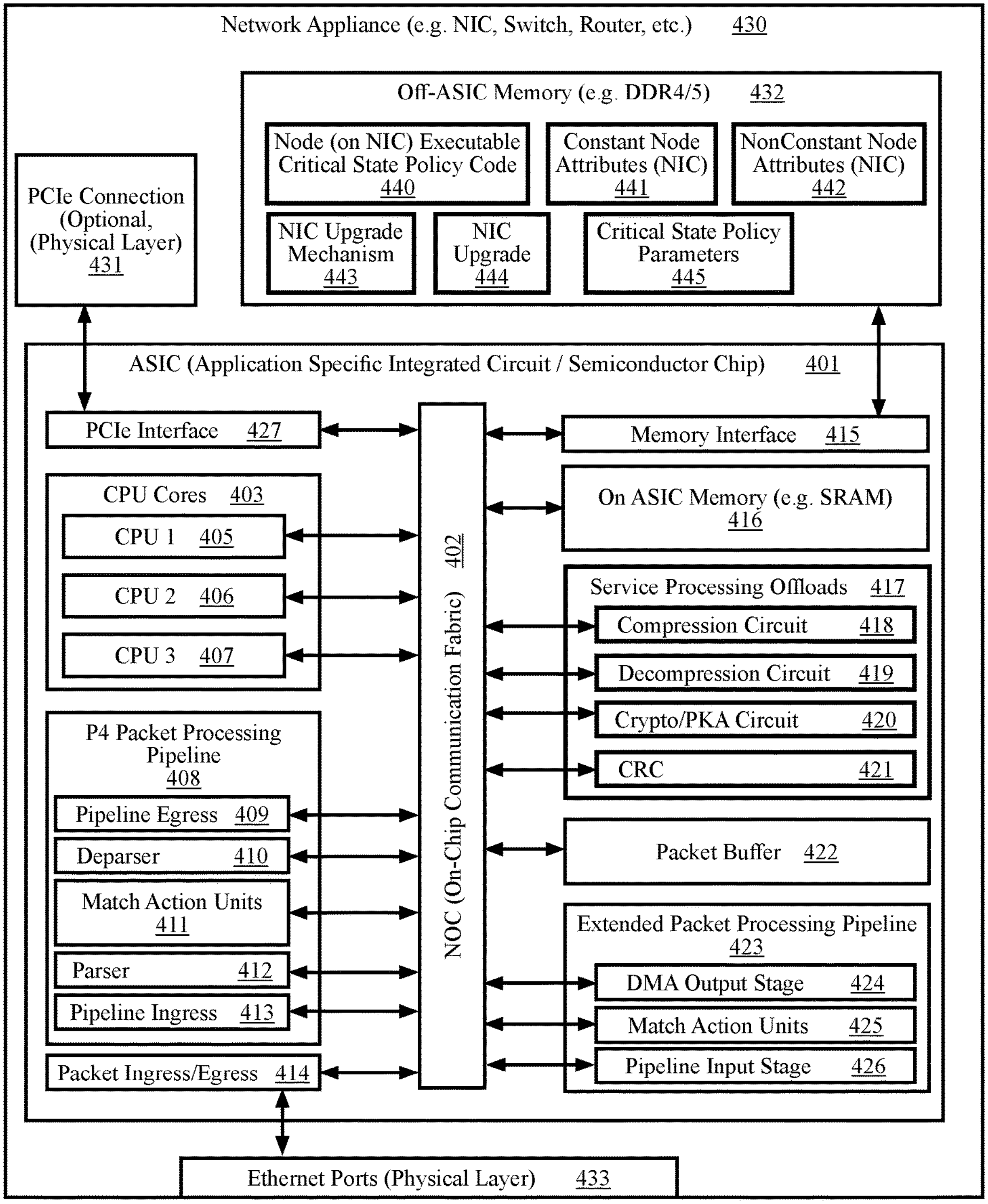
FIG. 4 is a functional block diagram of a network appliance such as a network interface card (NIC) or a network switch having an application specific integrated circuit (ASIC), according to some aspects.

FIG. 3 is a diagram illustrating a nonlimiting example of constant node attributes 301 according to some aspects. The values of the constant node attributes 301 may be assigned to the node at startup, as part of the node's configuration, by a work node manager 111, etc. The constant node attributes can include a node name, a node type, a critical state policy identifier, a list of node groups of which the node is a member, a node role, a smart NIC type, a smart NIC manager, an enable upgrade method, a disable upgrade method, an upgrade method, an upgrade download method, and other node tags/labels/parameters. As discussed above, a NIC can provide network connectivity to a node. Smart NICs are NICs that can perform processing related to network communications that, in the past, was performed by the hosts. FIG. 4 illustrates a smart NIC. The smart NIC type can be the model number of the smart NIC. Smart NICs may be centrally managed by a process running on a host or VM. For example, the DSC-100 is a smart NIC model provided by Pensando Systems, Inc. and the "Venice" smart NIC manager provided by Pensando Systems, Inc. can run on a node and manage smart NICs such as the DSC-100.

The enable upgrade method can be a web hook, remote procedure call (RPC), HTTP request, etc. that can be used to enable upgrades at the node. The disable upgrade method can be a web hook, RPC, HTTP request, etc. that can be used to disable upgrades at the node. For example, the enable/disable upgrade methods can cause a nonconstant attribute to indicate that upgrading is currently allowed or not allowed. The nonconstant attribute can be a value stored in a file, a filename of a file in a filesystem, a value stored in a memory, etc. When an upgrade is triggered on the node, the local upgrade mechanism 107 can exit without upgrading the node if upgrades are disabled. When an upgrade is triggered on the node, the local upgrade mechanism 107 can attempt upgrading the node if upgrades are enabled. The upgrade method can be a web hook, RPC, HTTP request, etc. that causes the upgrade mechanism 107 to execute. The upgrade download method can use a file download mechanism implemented by the node to download the upgrade to the node. In some implementations, the upgrade may be stored in a filesystem or other data store that can be accessed by numerous nodes.

FIG. 4 is a functional block diagram of a network appliance 430 such as a network interface card (NIC) or a network switch having an application specific integrated circuit (ASIC) 401, according to some aspects. A network appliance that is a NIC includes a peripheral component interconnect express (PCIe) connection 431 and can be installed in a host computer. A NIC can provide network services to the host computer and to virtual machines (VMs) running on the host computer. The network appliance 430 includes an off-ASIC memory 432, and ethernet ports 433. The off-ASIC memory 432 can be one of the widely available memory modules or chips such as double data rate version 4 (DDR4) synchronous DRAM (SDRAM) modules such that the ASIC has access to many gigabytes of memory. The ethernet ports 433 provide physical connectivity to a computer network such as the internet.

The ASIC 401 is a semiconductor chip having many core circuits interconnected by an on-chip communications fabric, sometimes called a network on a chip (NOC) 402. The NOC can be an implementation of a standardized communications fabric such as the widely used advanced extensible interface (AXI) bus. The ASIC's core circuits can include a PCIe interface 427, central processing unit (CPU) cores 403, P4 packet processing pipeline 408 elements, memory interface 415, on ASIC memory (e.g., SRAM) 416, service processing offloads 417, a packet buffer 422, extended packet processing pipeline 423, and packet ingress/egress circuits 414. A PCIe interface 427 can be used to communicate with a host computer via the PCIe connection 431. The CPU cores 403 can include numerous CPU cores such as CPU 1 405, CPU 2 406, and CPU 3 407. The P4 packet processing pipeline 408 can include a pipeline ingress circuit 413, a parser circuit 412, match-action units 411, a deparser circuit 410, and a pipeline egress circuit 409. The service processing offloads 417 are circuits implementing functions that the ASIC uses so often that its designers have chosen to provide hardware for offloading those functions from the CPUs. The service processing offloads can include a compression circuit 418, decompression circuit 419, a crypto and public key authentication (PKA) circuit 420, and a cyclic redundancy check (CRC) calculation circuit 421. The specific core circuits implemented within the nonlimiting example of ASIC 401 have been selected such that the ASIC implements many, perhaps all, of the functionality of an InfiniBand channel adapter, of an NVMe card, and of a network appliance that processes network traffic flows carried by IP (internet protocol) packets.

The P4 packet processing pipeline 408 is a specialized set of elements for processing network packets such as IP packets, NVMe protocol data units (PDUs), and InfiniBand PDUs. The P4 pipeline can be configured using a domain-specific language. The concept of a domain-specific language for programming protocol-independent packet processors, known simply as "P4," has developed as a way to provide some flexibility at the data plane of a network appliance. The P4 domain-specific language for programming the data plane of network appliances is defined in the "P416 Language Specification," version 1.2.0, as published by the P4 Language Consortium on Oct. 23, 2019. P4 (also referred to herein as the "P4 specification," the "P4 language," and the "P4 program") is designed to be implementable on a large variety of targets including network switches, network routers, programmable NICs, software switches, FPGAs, and ASICs. As described in the P4 specification, the primary abstractions provided by the P4 language relate to header types, parsers, tables, actions, match-action units, control flow, extern objects, user-defined metadata, and intrinsic metadata.

The network appliance 430 can include a memory 432 for running Linux or some other operating system. The memory 432 can also be used to store node executable critical state policy code 440, constant node attributes 441, nonconstant node attributes 442, a NIC upgrade mechanism 443, a NIC upgrade 444, and critical state policy parameters 445. The node executable critical state policy code 440 can be code that the NIC can execute to determine if the NIC is in a critical state or a noncritical state, to determine node attributes, etc. The results of running the node executable critical state policy code 440 can be returned to the upgrade manager. The constant node attributes 441 can include values for constant attributes of the NIC itself. FIG. 3 shows some of the constant node attributes a NIC may have. The nonconstant node attributes 442 can include values for nonconstant attributes of the NIC itself. FIG. 2 shows some of the nonconstant node attributes a NIC may have. The NIC may also measure attributes of the host computer or VMs serviced by the NIC. Those attributes can include statistics of network use, statistics of remote storage use, etc. As such, the NIC can provide the values of other nodes' constant and nonconstant attributes to the upgrade manager. The NIC upgrade 444 can include code and data to be installed on the NIC. Other systems, such as host computers and VMs may similarly store an upgrade in memory. The NIC upgrade mechanism 443, can include instructions that the NIC performs as part of an upgrade process. Such instructions can include commands to delete programs or data, commands to copy upgrade data (e.g., data in the NIC upgrade 444) to locations within the system, to download and install programs (e.g., "apt-get" commands of some Linux distributions), and other instructions. The critical state policy parameters 445 can include values used by the node executable critical state policy code.

The CPU cores 403 can be general purpose processor cores, such as reduced instruction set computing (RISC) processor cores, advanced RISC machine (ARM) processor cores, microprocessor without interlocked pipelined stages (MIPS) processor cores, and/or x86 processor cores, as is known in the field. Each CPU core can include a memory interface, an ALU, a register bank, an instruction fetch unit, and an instruction decoder, which are configured to execute instructions independently of the other CPU cores. The CPU cores may be programmable using a general-purpose programming language such as C.

The CPU cores 403 can also include a bus interface, internal memory, and a memory management unit (MMU) and/or memory protection unit. For example, the CPU cores may include internal cache, e.g., L1 cache and/or L2 cache, and/or may have access to nearby L2 and/or L3 cache. Each CPU core may include core-specific L1 cache, including instruction-cache and data-cache and L2 cache that is specific to each CPU core or shared amongst a small number of CPU cores. L3 cache may also be available to the CPU cores.

There may be multiple CPU cores 403 available for control plane functions and for implementing aspects of a slow data path that includes software implemented packet processing functions. The CPU cores may be used to implement discrete packet processing operations such as L7 applications (e.g., HTTP load balancing, L7 firewalling, and/or L7 telemetry), certain InfiniB and channel adapter functions, flow table insertion or table management events, connection setup/management, multicast group join, deep packet inspection (DPI) (e.g., URL inspection), storage volume management (e.g., NVMe volume setup and/or management), encryption, decryption, compression, and decompression, which may not be readily implementable through a domain-specific language such as P4, in a manner that provides fast path performance as is expected of data plane processing.

The packet buffer 422 can act as a central on-chip packet switch that delivers packets from the network interfaces 433 to packet processing elements of the data plane and vice-versa. The packet processing elements can include a slow data path implemented in software and a fast data path implemented by packet processing circuitry 408, 423.

The packet processing circuitry 408, 423 can be a specialized circuit or part of a specialized circuit implementing programmable packet processing pipelines. Some embodiments include a P4 pipeline as a fast data path within the network appliance. The fast data path is called the fast data path because it processes packets faster than a slow data path that can also be implemented within the network appliance. An example of a slow data path is a software implemented data path wherein the CPU cores 403 and memory 432 are configured via software to implement a slow data path.

The ASIC 401 is illustrated with a P4 packet processing pipeline 408 and an extended packet processing pipeline 423. The extended packet processing pipeline is a packet processing pipeline that has a direct memory access (DMA) output stage 424. The extended packet processing pipeline has match-action units 425 that can be arranged as a match-action pipeline. The extended packet processing pipeline has a pipeline input stage 426 that can receive packet header vectors (PHVs) or directives to perform operations. A PHV can contain data parsed from the header and body of a network packet by the parser 412.

All memory transactions in the NIC 430, including host memory transactions, on board memory transactions, and registers reads/writes may be performed via a coherent interconnect 402. In one nonlimiting example, the coherent interconnect can be provided by a network on a chip (NOC) "IP core" (in this one context, "IP" is an acronym for intellectual property). Semiconductor chip designers may license and use prequalified IP cores within their designs. Prequalified IP cores may be available from third parties for inclusion in chips produced using certain semiconductor fabrication processes. A number of vendors provide NOC IP cores. The NOC may provide cache coherent interconnect between the NOC masters, including the packet processing pipeline circuits 408, 423, CPU cores 403, memory interface 415, and PCIe interface 427. The interconnect may distribute memory transactions across a plurality of memory interfaces using a programmable hash algorithm. All traffic targeting the memory may be stored in a NOC cache (e.g., 1 MB cache). The NOC cache may be kept coherent with the CPU core caches.

FIG. 5 illustrates critical state policy parameters 501 and a critical state policy 520 according to some aspects. The critical state policy parameters can include a critical state policy identifier 502, endpoint criteria 503, node group criteria 504, time/date exclusion criteria 505, role criteria 506, process criteria 507, CPU use criteria 508, process CPU use criteria 509, and other criteria. The critical state policy identifier 502 (e.g., Critical_US_OLTP) can identify the critical state policy that can determine the criticality state of the node based on the other critical state policy parameters 501. The endpoint criteria 503 (e.g., OLTP Server) can indicate the function of the node. The node group criteria 504 (e.g., Production and Customer) can indicate the person or group using the node. "Production and Customer" may indicate that a customer is using the node in production. Such nodes may need to be kept far more stable than, for example, a "R&D and Scratch" node. The time/date exclusion criteria 505 (e.g., November 25-December 1) can indicate date ranges or time ranges during which a node must not be upgraded. For example, a customer's production OLTP server may need to run without interruption for the week that begins on the Thanksgiving holiday celebrated in the United States. The role criteria 506 (e.g., ClusterHead) can indicate a role held by the node within a tenant's infrastructure. The process criteria 507 (e.g., oltp_proc) can indicate a process that should not be interrupted by an upgrade of the node. The CPU use criteria 508 (e.g., 70%) can indicate that the node should not be upgraded when the CPU utilization is higher than the given threshold. The process CPU use criteria 509 (e.g., {hap_proc, 30%}) can indicate that the node should not be upgraded if a particular process has a CPU usage exceeding a given threshold.

The critical state policy 520 provides an example of the critical state policy parameters incorporated in executable code. Although the code is pseudocode, one practiced in the art would understand that it shows how the critical state policy parameters 501 could be incorporated into executable code that can be run by a node, an upgrade manager, or any other machine that has access to the node's constant and nonconstant node attributes. The executable code's return value indicates "Critical" or "NonCritical" to thereby indicate the node's criticality state according to this particular policy. One or more policies may be checked for a single node where a "Critical" result from any one policy indicates that the node is in a critical state.

Figure 6:
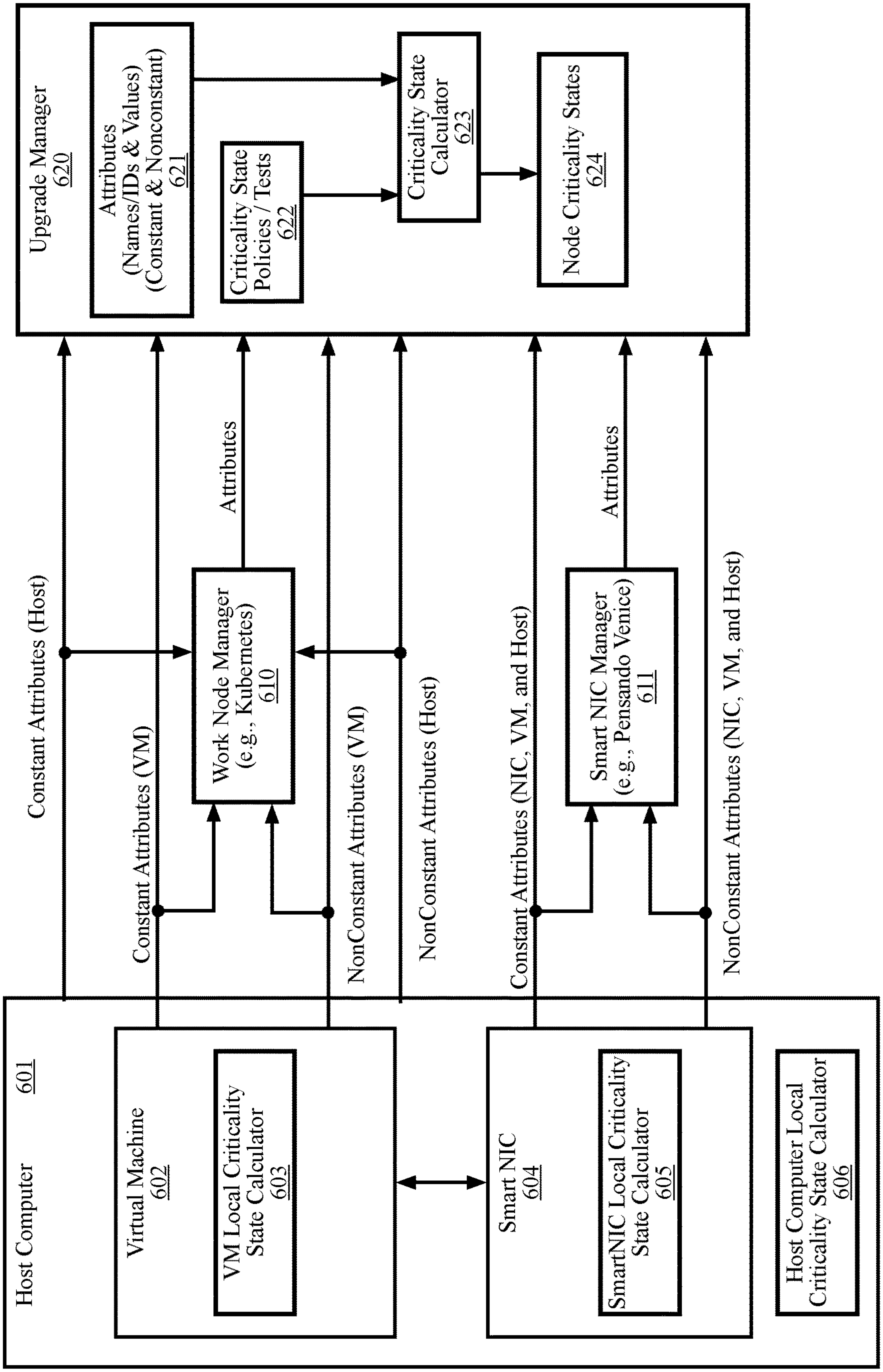
FIG. 6 is a high-level functional diagram illustrating nodes providing constant and nonconstant node attributes to an upgrade manager according to some aspects.

FIG. 6 is a high-level functional diagram illustrating nodes 601, 602, 604 providing constant and nonconstant node attributes to an upgrade manager 620 according to some aspects. The smart NIC 604 is installed in the host computer 601. The host computer and processes running on the host computer can use the smart NIC 604 for network communications. A virtual machine (VM) 602 is running on the host computer 601 and can use the smart NIC for network communications. The host computer 601 is an upgradeable node that can send its constant and nonconstant attributes to an upgrade manager 620 and to a work node manager 610. The VM 602 is an upgradeable node that can send its constant and nonconstant attributes to the upgrade manager 620 and to the work node manager 610. The work node manager (e.g., Kubernetes) can use the constant and nonconstant attributes to select which host computer is to host which VM. The work node manager 610 may also provide the constant and nonconstant attributes of VMs and host computers to the upgrade manager. The smart NIC 604 is an upgradeable node that can send its constant and nonconstant attributes to the upgrade manager 620 and to a smart NIC manager 611. The smart NIC manager can also provide some of the constant and nonconstant attributes of the host computer and the VM to the upgrade manager 620. Here, it is understood that the upgrade manager receives the attribute values for the attributes sent by the nodes. The upgrade manager 620 can store the attributes values 621 for each node in, for example, a database that stores attribute values in association with attribute names/identifiers and node identifiers. Here, the attribute name can act as the attribute identifier or each attribute can have an attribute identifier (e.g., a number) that identifies the attribute. The upgrade manager can also store criticality state policies or tests such as critical state policy 520. A criticality state calculator 623 can use the attributes names/identifiers and attribute values 621 to determine a criticality state for each node 624.

The host computer 601 can have a host computer local criticality state calculator 606 such that the host can infer its own criticality state and can report that inferred state to the upgrade manager. The host computer local criticality state calculator 606 can be executable code downloaded to the host by another node such as the upgrade manager 620. The VM 602 can have a VM local criticality state calculator 603 such that the VM can infer its own criticality state and can report that inferred state to the upgrade manager. The VM local criticality state calculator 603 can be executable code downloaded to the VM by another node such as the upgrade manager 620. The smart NIC 604 can have a smart NIC local criticality state calculator 605 such that the smart NIC can infer its own criticality state and can report that inferred state to the upgrade manager. The smart NIC local criticality state calculator 605 can be executable code downloaded to the smart NIC by another node such as the upgrade manager 620. The criticality state calculator for any particular node can be run on that particular node or on any other node that has access to that particular node's constant and nonconstant attributes. The criticality states can be reported to the upgrade manager and to other nodes that may track, store, or use the criticality state data of the nodes.

Figure 7:
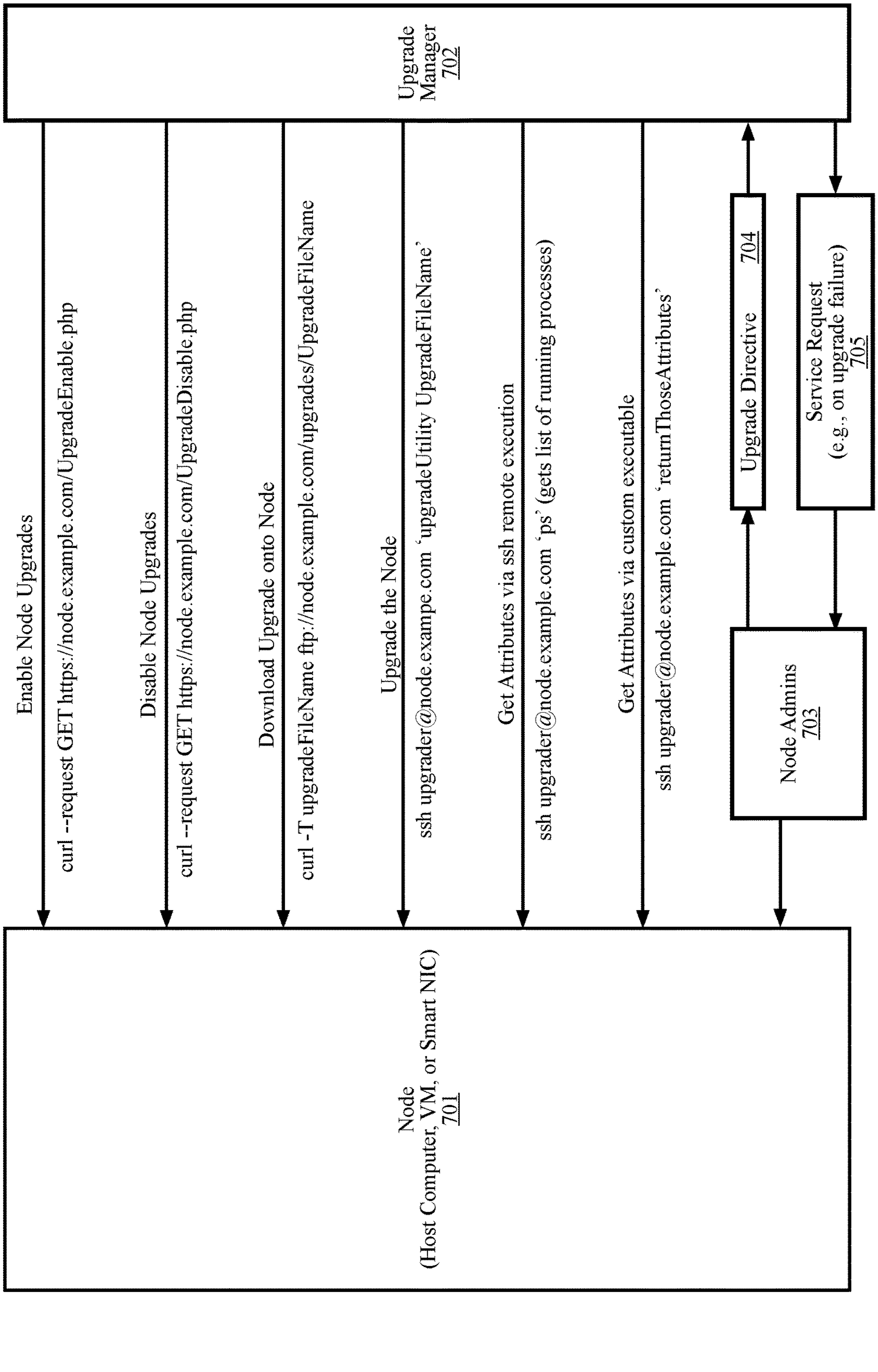
FIG. 7 is a high-level functional diagram illustrating an upgrade manager sending directives to a node according to some aspects.

FIG. 7 is a high-level functional diagram illustrating an upgrade manager 702 sending directives to a node 701 according to some aspects. The constant node attributes 301 illustrated in FIG. 3 include an enable upgrade method, a disable upgrade method, an upgrade method, an upgrade download method. FIG. 7 illustrates the upgrade manager 702 invoking such methods on a node 701. The node 701 can be a host computer, a VM, or a smart NIC. The illustrated methods use the Linux commands such as ssh and curl to implement the methods. Other operating systems may use the same or similar commands.

The upgrade manager 702 may receive an upgrade directive 704 from an administrator 703 such as a node administrator or data center administrator. The upgrade directive can provide a list of nodes to upgrade or can otherwise identify the nodes to upgrade. For example, the upgrade directive can specify nodes using parameters such as a tenant identifier, a node name, a node type, a node role, a smart NIC type, etc. For example, all of a tenet's nodes can be specified via the tenant identifier associated with the tenant. Another example is that the tenant's SQL servers can be specified using the tenant identifier and one or more node types. The upgrade manager may select a set of nodes and upgrade the ones in a noncritical state. The upgrade manager may schedule a later attempt to upgrade the remaining nodes, some of which will still not be upgraded because they are again in a critical state. Nodes that are not upgraded after a specific time, elapsed time, or number of upgrade attempts may be reported via service request 705 to an administrator 703. Service requests may also be sent when another one of the methods, such as the "download upgrade onto node" method fails. The upgrade manager may automatically send service requests 705 that can be received by administrators 703.

Figure 8:
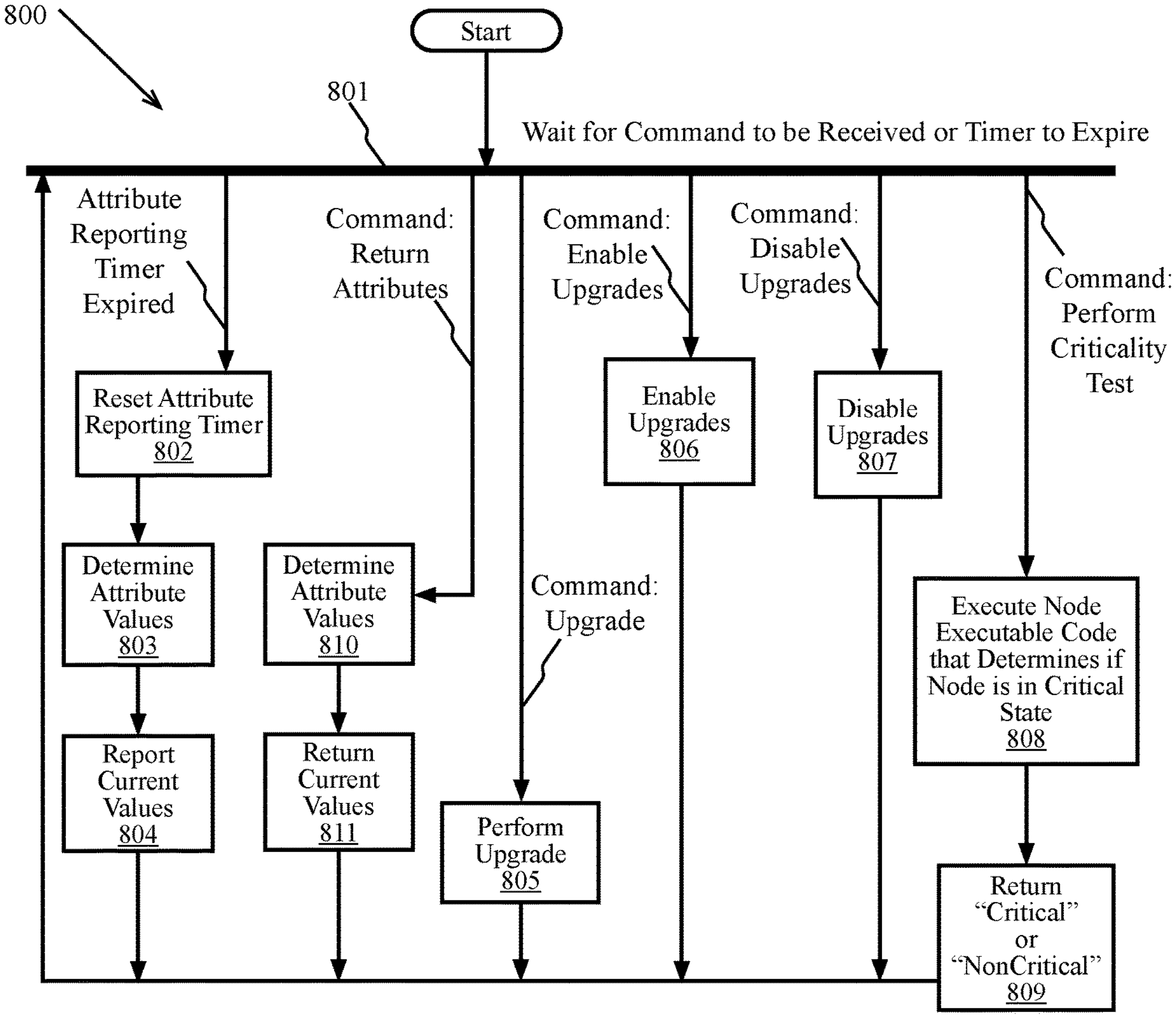
FIG. 8 is a high-level flow diagram illustrating the processing of directives from an upgrade manager according to some aspects.

FIG. 8 is a high-level flow diagram illustrating the processing of directives from an upgrade manager 800 according to some aspects. After the start, the process can wait to receive a command or for a timer to expire. A node can be configured to periodically report attributes to the upgrade manager or another node that is collecting the data. As such, one of the timers can be an attribute reporting timer. When the attribute reporting timer expires, the process can reset the attribute reporting timer 802 so the timer expires after another time period elapses, determine the current attributes 803, and report the current attributes 804 to the data collector (e.g., upgrade manager) before looping back to waiting 801. The node's criticality state, as determined by the node itself, may be one of the nonconstant attributes. In response to receiving a command to return attributes, the node can determine the attributes' current values 810, and return the current values of the attributes 811 before looping back to waiting. In response to a command to upgrade, the node can perform the upgrade 805. The upgrade may be performed by executing a local upgrade mechanism 107. In response to a command to enable upgrades, the node can enable upgrades 806 before looping back to waiting 801. In response to a command to disable upgrades, the node can disable upgrades 807 before looping back to waiting 801. A node may enable or disable upgrades by setting a nonconstant attribute to indicate that upgrades are enabled or disabled. Such a nonconstant attribute can be a value stored in volatile or nonvolatile memory, a database entry, etc. In response to a command to perform a criticality test, the node can execute node executable code that determines if the node is in a critical state 808, and can return the criticality state 809 (e.g., "Critical" or "NonCritical") before looping back to waiting 801. The node executable code that determines if the node is in a critical state may be a policy such as critical state policy 520.

Figure 9:
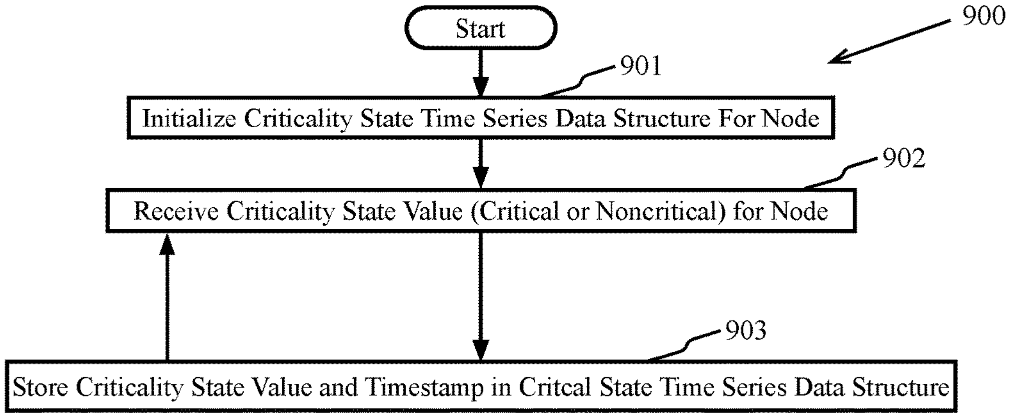
FIG. 9 is a high-level flow diagram illustrating assembling time series data indicating a node's criticality state as a function of time according to some aspects.

FIG. 9 is a high-level flow diagram illustrating assembling time series data 900 indicating a node's criticality state as a function of time according to some aspects. After the start, at block 901 the process can initialize a criticality time series data structure for a node. At block 902, the process can receive a criticality state value (e.g., Critical or NonCritical) for the node. At block 903, the process can store the criticality state value in association with a timestamp in the critical state time series data structure before looping back to block 902. The criticality state time series data structure can be a table in a database or other element used by a database to store data.

Figure 10:
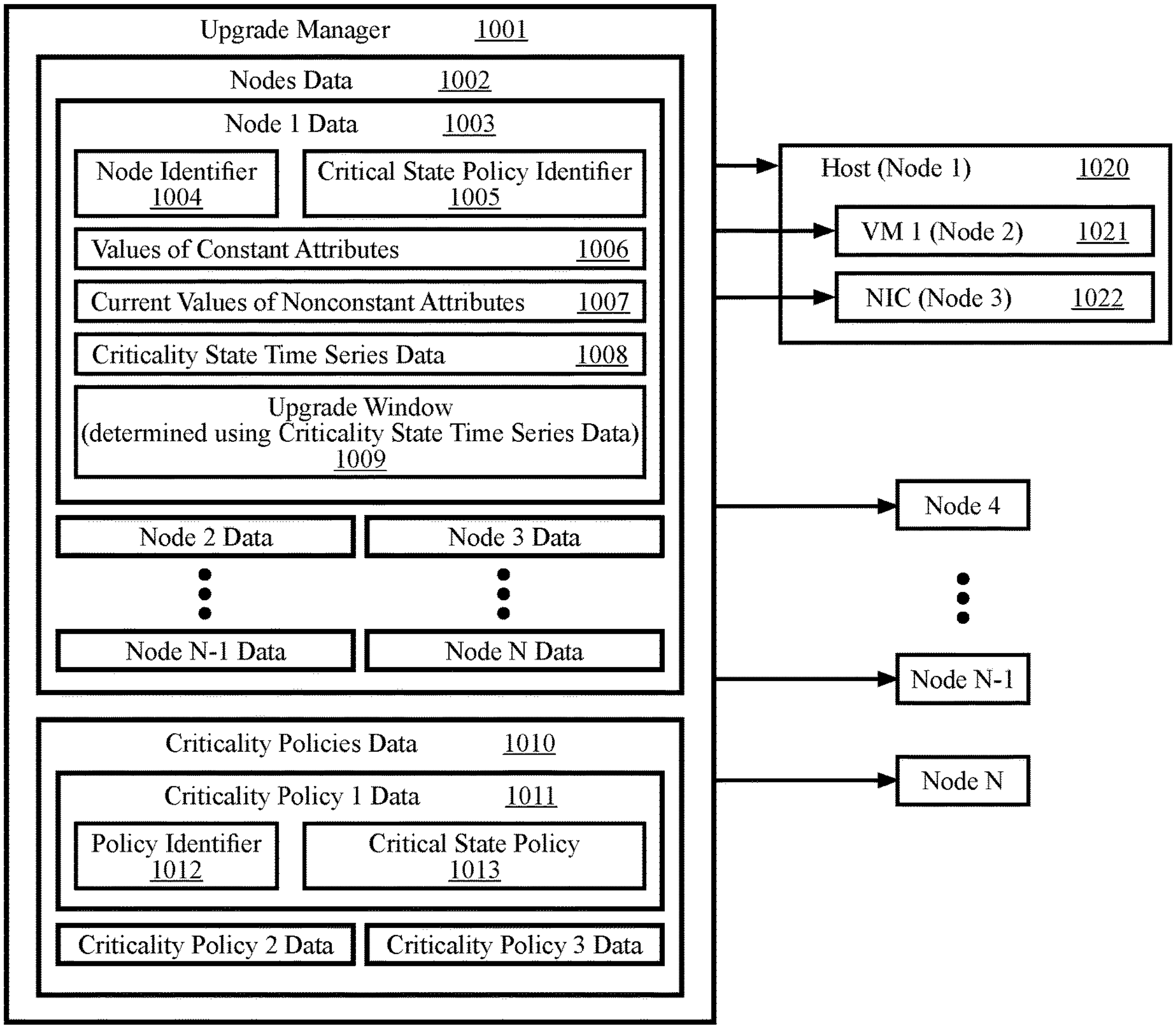
FIG. 10 is a high-level diagram illustrating an upgrade manager storing nodes data and criticality policies data according to some aspects.

FIG. 10 is a high-level diagram illustrating an upgrade manager 1001 storing nodes data 1002 and criticality policies data 1010 according to some aspects. The nodes data 1002 can include node 1 data 1003 and data for other nodes such as node 2, node 3, node N−1, and node N. The node data can include a node identifier 1004, critical state policy identifier 1005, values for constant attributes 1006, current values for nonconstant node attributes 1007, criticality time series data 1008, and an upgrade window 1009. The upgrade window 1009 is a time period that may be predicted from the criticality time series data. For example, the upgrade manager can identify an upgrade window in the past and can predict similarly long upgrade windows will occur in the future (e.g., one day, two days, three days, four days, five days, six days, seven days, two weeks, three weeks, four weeks, or one month after the identified upgrade window). A one hour upgrade window for a node can be identified by determining that the node was in a noncritical state for an hour.

The upgrade manager can also store the criticality policies data 1010. Criticality policies data 1010 can include criticality policy 1 data 1011, criticality policy 2 data, criticality policy 3 data, and data for additional criticality policies. Criticality policy data can include a critical state policy 1013 stored in association with a criticality state policy identifier 1012.

To determine a node's criticality state, a criticality state calculator finds the node's data in nodes data 1002. The node's data includes current values for the node's attributes and a criticality state policy identifier. The critical state policy associated with the criticality state policy identifier in the criticality policies data 1010 and the current values for the node's attributes can be used to determine the node's current criticality state. As such, the upgrade manager 1001 can determine the criticality states of a host 1020, a VM 1021, a NIC 1022, and other nodes.

Figure 11:
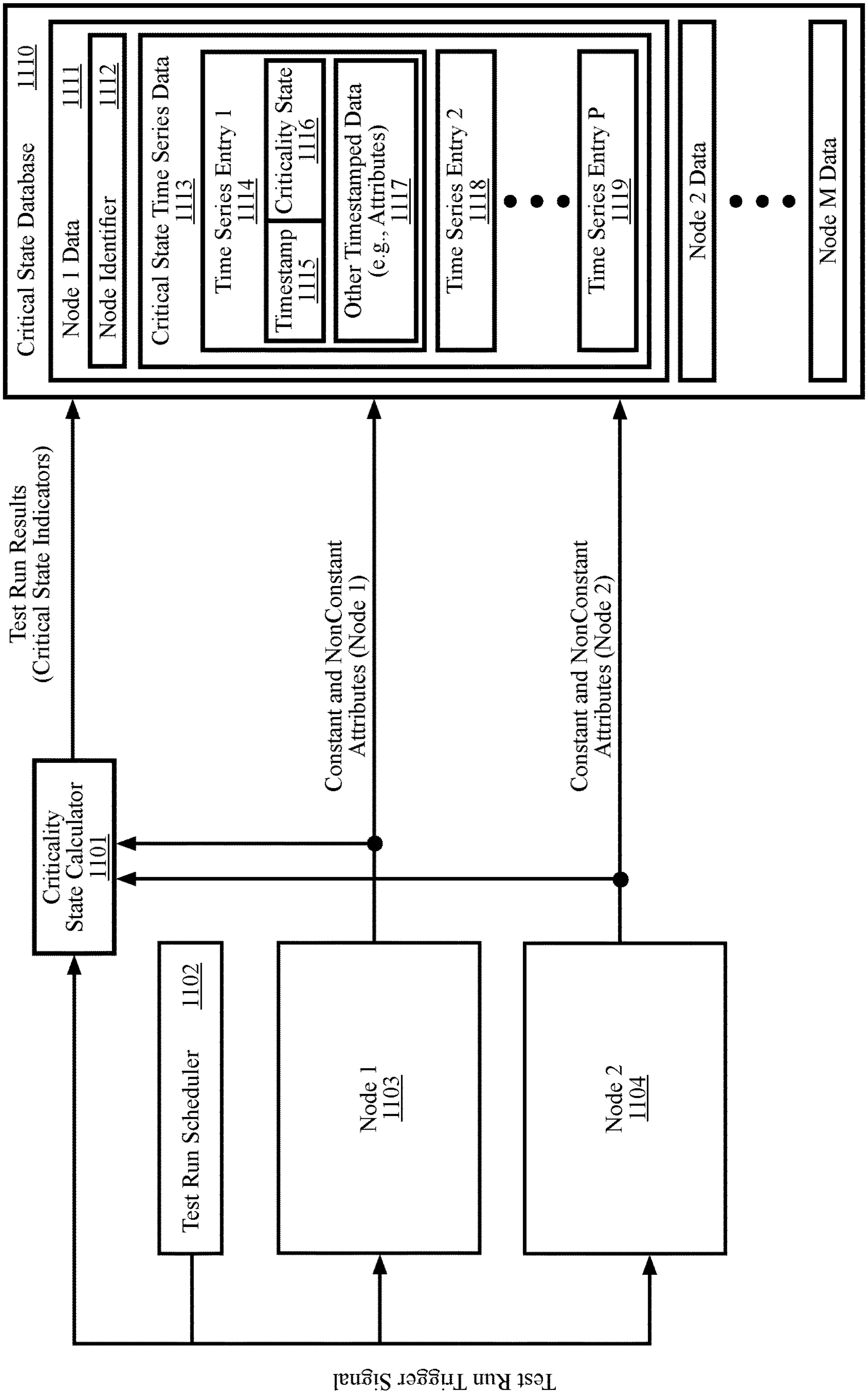
FIG. 11 illustrates a high-level diagram illustrating a critical state database storing critical state time series data according to some aspects.

FIG. 11 illustrates a high-level diagram illustrating a critical state database storing critical state time series data according to some aspects. Node 1 1103 and node 2 1104 can report constant and nonconstant attributes to a criticality state calculator 1101 and a critical state database 1110. The nodes can report the attributes periodically using their own timers, when triggered by a test run scheduler 1102, etc. The test run scheduler 1102 can also trigger the criticality state calculator 1101 to determine the criticality states of the nodes 1103, 1104. Test runs can periodically determine node criticality states when there is no current intention to upgrade the node. The attribute data and criticality state data can be used to predict when nodes will be in critical or noncritical states. Such data and predictions can be useful in administering upgrades. For example, an upgrade can be scheduled for when a node is predicted to be in a noncritical state. If the prediction is correct, the node will be upgraded without further action required such as rescheduling the upgrade or tracking failed upgrades. If the prediction is wrong, then the upgrade fails because the node is in a critical state. Successfully predicting upgrade windows also makes the upgrade process predictable, which makes data center administration more predictable.

The critical state database 1110 can include node data such as node 1 data 1111, node 2 data, and node M data. Node data, such as node 1 data 1111, can include a node identifier 1112 and critical state time series data 1113. Critical state time series data 1113 can include time series entries such as time series entry 1 1114, time series entry 2 1118, and time series entry P 1119. Time series entries can include a timestamp 1115 indicating a time, the node's criticality state at that time 1116, and other timestamped data 1117 such as values for attributes.

Figure 12:
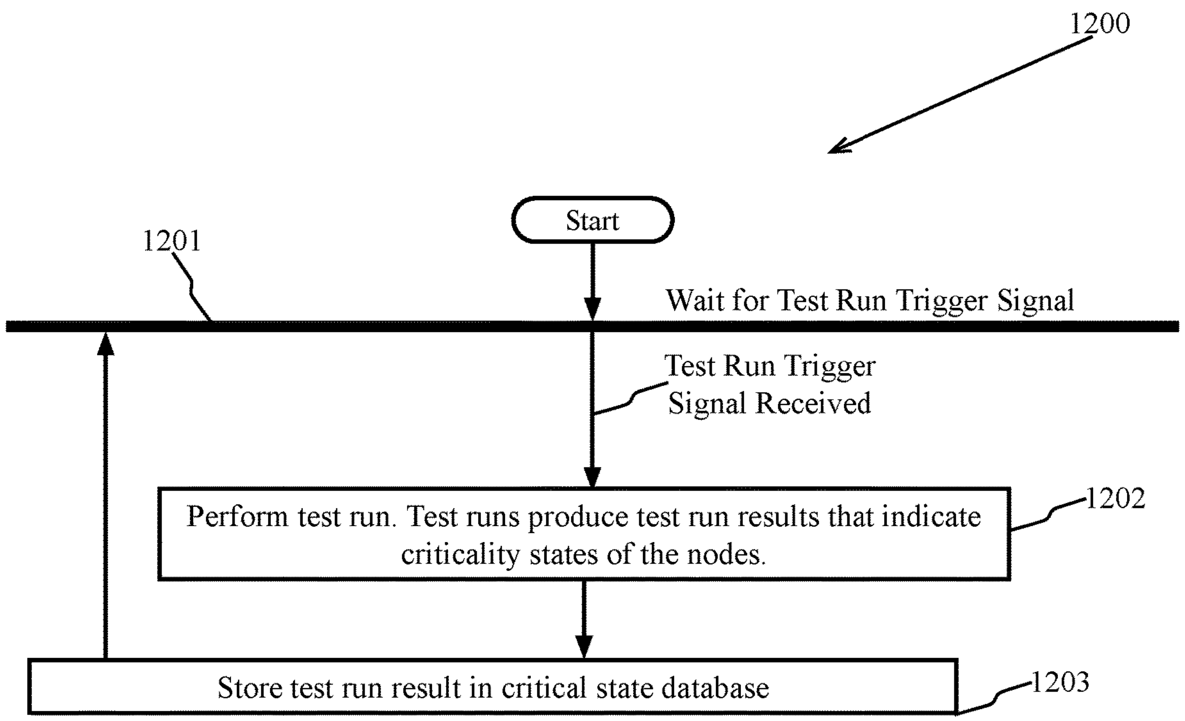
FIG. 12 illustrates a high-level flow diagram of a method for performing test runs and generating critical state time series data according to some aspects.

FIG. 12 illustrates a high-level flow diagram of a method for performing test runs and generating critical state time series data 1200 according to some aspects. After the start, the process can wait 1201 for a test run trigger signal. In response to receiving the test run trigger signal, the process can perform a test run 1202. Test runs produce test run results that indicate criticality states of the nodes, but the nodes aren't upgraded during test runs. The test run results (e.g., Critical or NonCritical) are then stored in the critical state database 1203 before the process loops back to waiting 1201.

Figure 13:
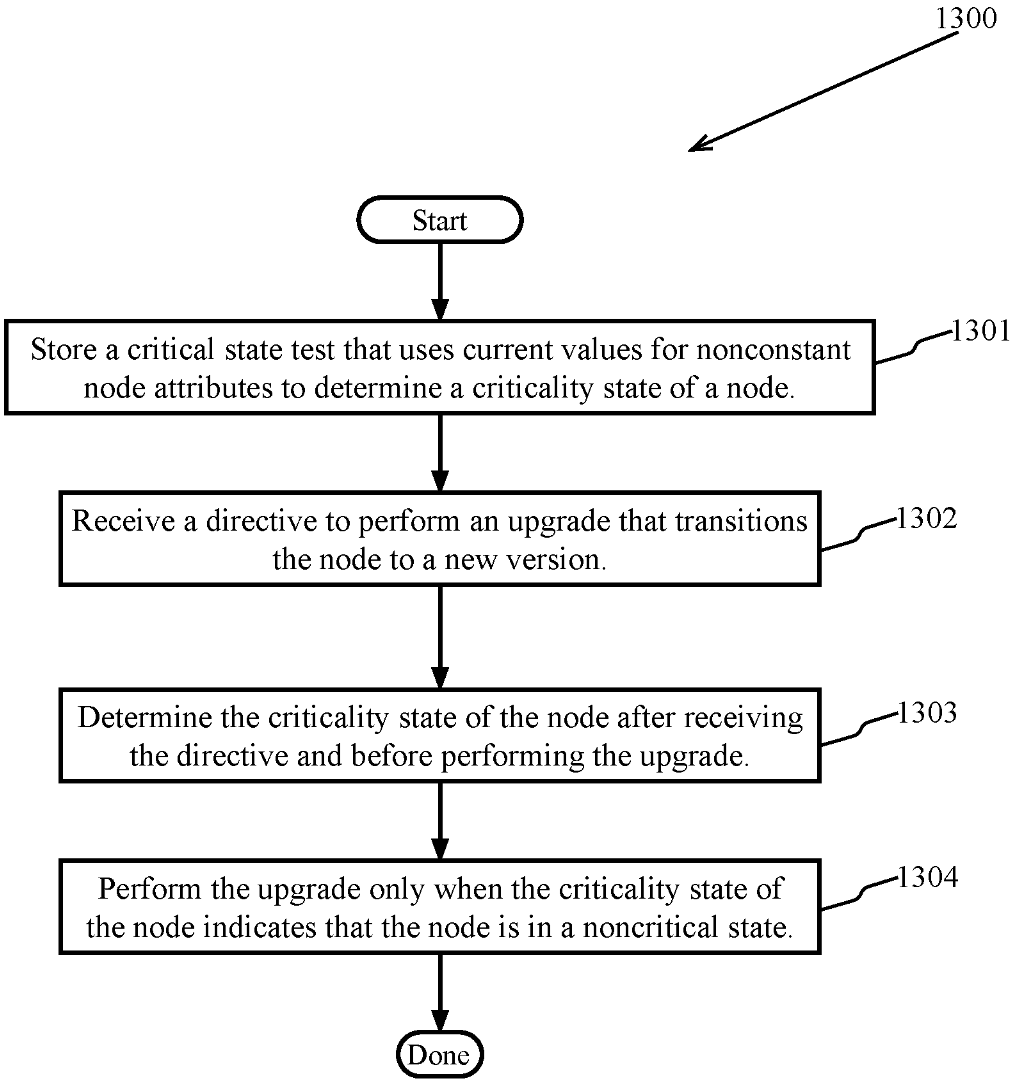
FIG. 13 illustrates a high-level flow diagram of a method for a data driven policy-based approach to improve upgrade efficacy according to some aspects.

FIG. 13 illustrates a high-level flow diagram of a method for a data driven policy-based approach to improve upgrade efficacy 1300 according to some aspects. After the start, at block 1301 the method can store a critical state test that uses current values for nonconstant node attributes to determine a criticality state of a node. At block 1302, the process can receive a directive to perform an upgrade that transitions the node to a new version. At block 1303, the process can determine the criticality state of the node after receiving the directive and before performing the upgrade. At block 1304, the process can perform the upgrade only when the criticality state of the node indicates that the node is in a noncritical state.

Aspects described above can be ultimately implemented in a network appliance that includes physical circuits that implement digital data processing, storage, and communications. The network appliance can include processing circuits, ROM, RAM, CAM, and at least one interface (interface(s)). The CPU cores described above are implemented in processing circuits and memory that is integrated into the same integrated circuit (IC) device as ASIC circuits and memory that are used to implement the programmable packet processing pipeline. For example, the CPU cores and ASIC circuits are fabricated on the same semiconductor substrate to form a System-on-Chip (SoC). The network appliance may be embodied as a single IC device (e.g., fabricated on a single substrate) or the network appliance may be embodied as a system that includes multiple IC devices connected by, for example, a printed circuit board (PCB). The interfaces may include network interfaces (e.g., Ethernet interfaces and/or InfiniB and interfaces) and/or PCI Express (PCIe) interfaces. The interfaces may also include other management and control interfaces such as I2C, general purpose IOs, USB, UART, SPI, and eMMC.

Although the operations of the method(s) herein are shown and described in a particular order, the order of the operations of each method may be altered so that certain operations may be performed in an inverse order or so that certain operations may be performed, at least in part, concurrently with other operations. Instructions or sub-operations of distinct operations may be implemented in an intermittent and/or alternating manner.

It should also be noted that at least some of the operations for the methods described herein may be implemented using software instructions stored on a computer usable storage medium for execution by a computer. As an example, an embodiment of a computer program product includes a computer usable storage medium to store a computer readable program.

The computer-usable or computer-readable storage medium can be an electronic, magnetic, optical, electromagnetic, infrared, or semiconductor system (or apparatus or device). Examples of non-transitory computer-usable and computer-readable storage media include a semiconductor or solid-state memory, magnetic tape, a removable computer diskette, a random-access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A system comprising:

memory in a first node, the memory configured to store values of constant node attributes of a second node, to store current values of nonconstant node attributes of the second node, and to store a critical state policy, the critical state policy including network interface card (NIC) executable code configured to produce one of the current values of the nonconstant node attributes of the second node when executed by a NIC in the second node, and the critical state policy including node executable code configured to use the current values of the nonconstant node attributes of the second node and values of the constant node attributes to determine a criticality state value that has one of only two distinct values with only one of the two distinct values indicating that a node can be taken offline without disrupting critical operations; and a processor in the first node, the processor configured to perform an upgrade of the second node in response to determining that the criticality state value indicates that the second node can be taken offline without disrupting critical operations by: determining the criticality state value by running the NIC executable code and the node executable code on the NIC in the second node;

performing the upgrade of the second node in response to determining that the criticality state value indicates that the second node can be taken offline without disrupting critical operations;

wherein the first node is configured to obtain test run results by performing test runs of the critical state policy and to store the test run results as time series entries in a critical state database; and wherein the first node is configured to produce criticality state time series data that indicates a criticality state of each of the nodes as a function of time, determine upgrade windows for the nodes, and upgrade the nodes based on the upgrade windows.

2. The system of claim 1, wherein the constant node attributes of the second node include a node role indicator that indicates a role held by the second node within an infrastructure.

3. The system of claim 1, wherein:

one of the current values for the nonconstant node attributes of the second node is received from the second node in response to sending node executable code to the second node.

4. The system of claim 1, wherein:

the first node communicates over a network with the second node.

5. The system of claim 1, wherein the second node is configured to periodically provide one of the current values to the first node.

6. The system of claim 1, wherein:

the second node produces one of the current values for the nonconstant node attributes of the second node by executing node executable code in response to receiving the node executable code from the first node.

7. The system of claim 1, wherein:

a third node is a virtual machine (VM) running on the second node;

the NIC is configured to determine one of the current values for the nonconstant node attributes of the second node by running NIC executable code in response to receiving the NIC executable code from the first node; and the NIC is configured to determine a third current value that is one of the current values for the nonconstant node attributes of the third node by executing the NIC executable code on the NIC.

8. The system of claim 1, wherein a network interface card (NIC) is installed in the second node;

a third node is a virtual machine (VM) running on the second node; and the NIC is configured to produce one of the current values for the nonconstant node attributes of the third node in response to receiving NIC executable code from the first node.

9. The system of claim 1, wherein the second node is running a third node that is a virtual machine (VM), and a current value for a nonconstant node attribute of the third node is used to determine the criticality state value of the second node.

10. The system of claim 1, wherein:

the NIC executes the NIC executable code to determine one of the current values, and the upgrade upgrades the NIC.

11. The system of claim 1, wherein the current values for the nonconstant node attributes of the second node include a CPU usage statistic, a memory usage statistic, a non-volatile memory input/output statistic, a long-lived network session statistic, a short-lived network session statistic, and a process identifier that identifies a process running on the second node.

12. The system of claim 1, wherein the first node is configured to upgrade a plurality of nodes that are identified by a plurality of node identifiers, the first node stores a plurality of critical state policies corresponding to the nodes, the nodes are upgraded only when the nodes can be taken offline without disrupting critical operations according to the critical state policies.

13. The system of claim 1, wherein:

the first node is configured to store time series data that includes a plurality of time series entries that indicate a criticality state of the second node at a plurality of times;

the critical state policy uses values of constant node attributes to determine the criticality state of the second node;

executing the node executable code on the second node produces a first current value that is one of the current values for the nonconstant node attributes of the second node;

the NIC is configured to periodically determine a second current value that is one of the current values for the nonconstant node attributes of the second node;

the second current value is produced by executing the NIC executable code on the NIC;

a third node is a virtual machine (VM) running on the second node;

the NIC is configured to periodically determine a third current value that is one of the current values for the nonconstant node attributes of the third node;

the third current value is produced by executing the NIC executable code on the NIC; and the current values include a CPU usage statistic, a memory usage statistic, a non-volatile memory input/output statistic, a long-lived network session statistic, a short-lived network session statistic, and a process identifier that identifies a process running on the second node.

14. A system comprising:

a first node that includes a processor, the first node configured to upgrade a plurality of nodes in response to determining that the nodes can be taken offline without disrupting critical operations by:

storing, in a memory, a plurality of critical state policies corresponding to the nodes, values of constant node attributes of the nodes, current values of nonconstant node attributes of the nodes, and executable codes corresponding to the nodes in the critical state policies, the critical state policies including network interface card (NIC) executable code configured to produce one of the current values of the nonconstant node attributes of the nodes when executed by NICs of the nodes, and the critical state policies including node executable code configured to use the current values of the nonconstant node attributes of the nodes and the values of the constant node attributes of the nodes to determine criticality state values of the nodes; and using the processor to perform an upgrade that transitions one of the nodes in response to determining that a criticality state value indicates that the one of the nodes can be taken offline without disrupting critical operations, wherein:

the first node is configured to obtain test run results by performing test runs of the critical state policy and to store the test run results as time series entries in a critical state database;

running the NIC executable code and the node executable code on the NIC in a second one of the nodes determines the criticality state value of the second one of the nodes; and the first node is configured to produce criticality state time series data that indicates a criticality state of the plurality nodes as a function of time, determine upgrade windows for the nodes, and upgrade the nodes based on the upgrade windows.

15. The system of claim 14, wherein the one of the nodes is configured to periodically provide one of the current values of the nonconstant node attributes to the first node.

16. The system of claim 14, wherein:

one of the current values of the nonconstant node attributes is received in response to sending the node executable code corresponding to the one of the nodes to the one of the nodes.

17. The system of claim 14, wherein the one of the nodes is a virtual machine (VM) running on a host computer, a network interface card (NIC) is installed in the host computer, the NIC is configured to periodically determine one of the current values of the nonconstant node attributes of the VM.

18. The system of claim 14, wherein a virtual machine (VM) running on a host computer is configured to use a NIC installed in the host computer, the critical state policies include a critical state policy corresponding to the VM, and the NIC produces one of the current values of the nonconstant node attributes of the VM by executing the NIC executable code in the critical state policy corresponding to the VM.

* * * * *